2,990,845
FLOOD REGULATOR
David W. Sklash and Harley M. Selling, both of Detroit, Mich.
Filed Nov. 21, 1958, Ser. No. 775,474
2 Claims. (Cl. 137—358)

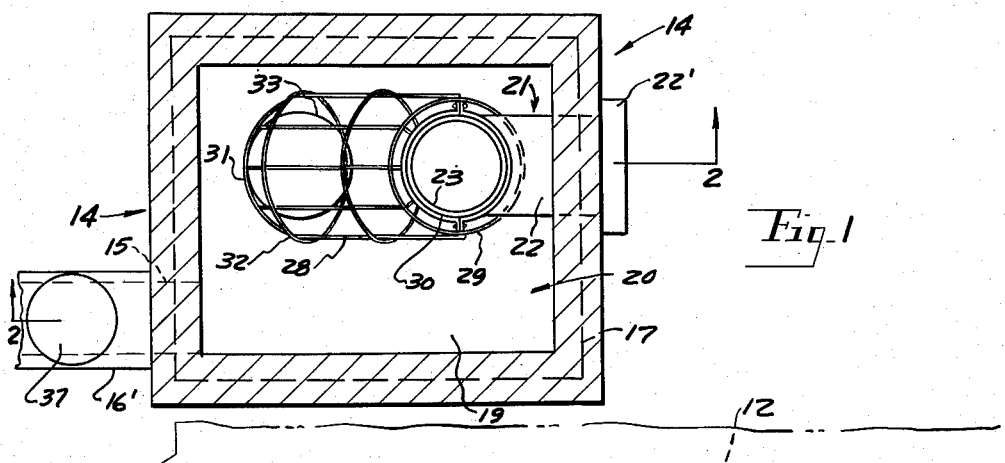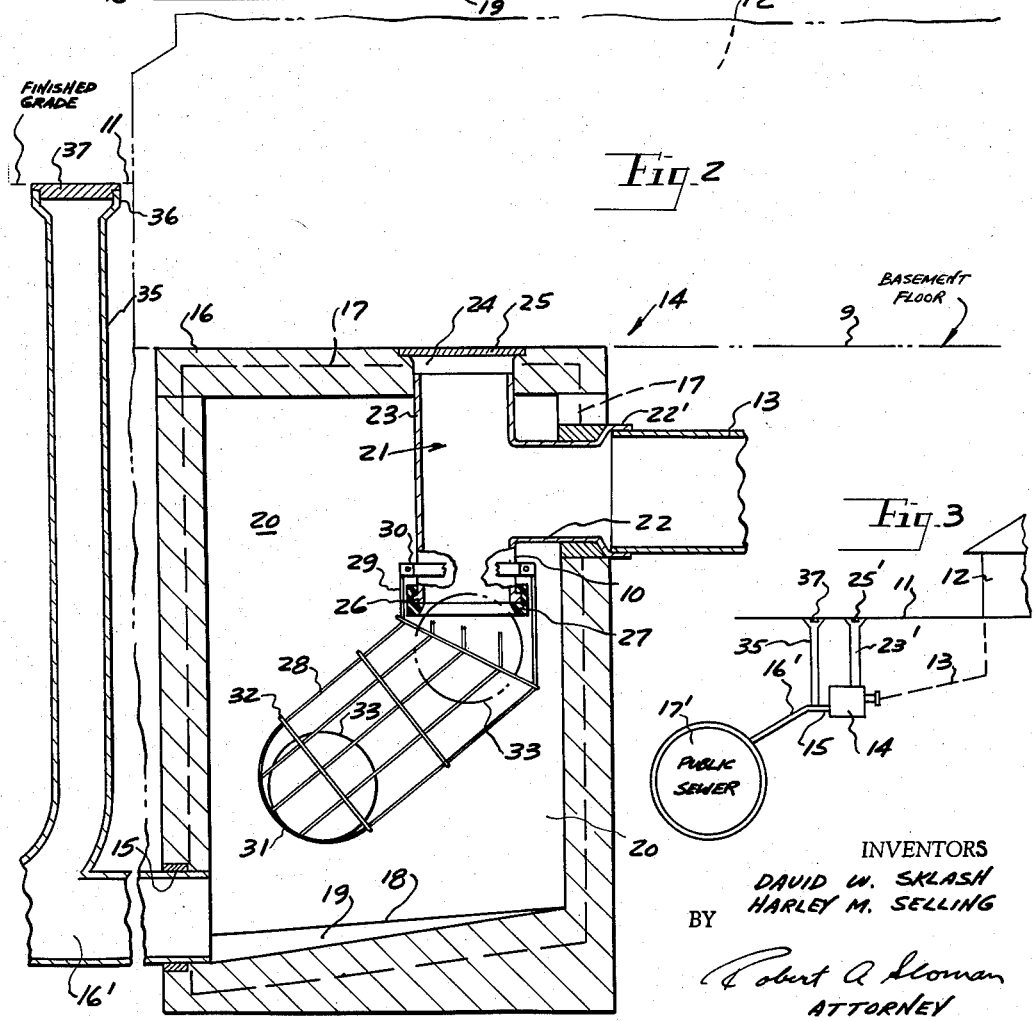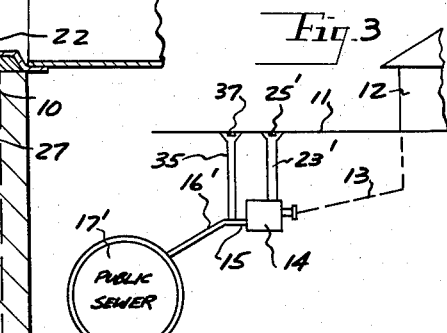

This invention relates to flood regulators and more particularly to a flood regulator which is installed indoors or outdoors in the drain line between the house or other building and the city sewer.

It is the object of the present invention to provide a novel flood regulator construction which effectively seals off backing up sewage to prevent its entry into basements.

It is another object herein to provide a flood regulator installation which is placed upon the interior or exterior of a house or building in the drain line to the city sewer, and is easily installed, maintained or replaced.

It is a further object herein of the present invention to provide a flood regulator housing through which effluent from the house drain sewage system may pass for direction to the city sewer together with a float type of valve for automatically closing off communication between the flood regulator and the main sewage line whereby upon rising of flood waters within the flood regulator such valve is raised for effectively sealing off said backing up sewage preventing its entry into the house or building.

It is a further object of the present invention to provide a T pipe fitting upon the interior of the flood regulator, one branch of which provides an inlet to the regulator, one branch of which provides an outlet with a valve seat on the interior of the regulator, there being a third branch in the form of a cleanout pipe accessible from the basement or finish grade surface, depending upon whether the regulator is installed under the basement floor or upon the outside of the building.

It is another object to provide in the drain connection between the regulator and sewer a pressure relief blow-off vent pipe which communicates with the exterior ground surface in the event that excess pressure under flood conditions is built up upon the interior of the flood regulator. Said vent pipe may also be used for clean out purposes.

These and other objects will be seen from the following specification and claims in conjunction with the appended drawing in which:

FIG. 1 is a plan section of the present flood regulator.

FIG. 2 is a section taken on line 2—2 of FIG. 1.

FIG. 3 is a diagram of the sewage connections between the house, flood regulator and public sewer when the regulator is outside of the house.

It will be understood that the above drawing illustrates merely preferred embodiments of the invention, and that other embodiments are contemplated within the scope of the claims hereafter set forth.

The present flood regulator is fully automatic, of simple design, and may be easily installed, maintained and replaced.

It is installed below the basement floor, FIG. 2, or in the drain line 13, as shown in FIG. 3, which represents the sewage outlet from house 12, diagrammatically shown, and is connected to the public sewer 17'. The effluent pipe 16' forming a part of drain 13 communicates with outlet 15 at the lower end of regulator casing 14, at one side thereof.

The regulator casing is preferably of concrete construction, rectangular in cross section, though it could be of any other shape, and includes cover 16 which is suitably secured and sealed to the top of the regulator casing defining chamber 20 therein. Said casing is of reinforced construction and includes the steel wire mesh 17 cast within the walls thereof. Cover 16 is substantially flush with basement floor 9, FIG. 2.

The bottom wall 18 is sloped downwardly from the right to the left and is pitched forwardly and downwardly at 19 for guiding collected fluids to outlet opening 15 within which is projected and secured the effluent pipe 16', which forms a part of the conventional drain line 13 between building 12 and public sewer 17'.

As shown in FIG. 1 the outlet opening 15 is located upon one side of the regulator wall adjacent bottom wall 18—19. The T-fitting 21 is positioned within the upper end of regulator box 14 located adjacent and above the opposite side of said bottom wall from the location of outlet opening 15.

Said T-fitting includes the horizontally disposed intake pipe 22 which projects outwardly and is sealed through the side wall of box 14 opposite from outlet opening 15 and terminates in an enlarged bell end 22' adapted to receive and have snugly sealed therein a portion of drain pipe 13 which forms a part of the drain line between building 12 and public sewer 17', and by which all drainage from the house passes through the present flood regulator box 14 before entry into the public sewer.

The purpose of the flood regulator is to prevent the backing up of sewage into the building.

The T fitting 21 within said regulator includes the downwardly directed outlet pipe 10 which has an annularly flanged end 26 over which is secured a suitable annular gasket 27, preferably of rubber, neoprene, or equivalent material and which defines a yielding ball valve seat.

Wire cage 28, including the longitudinally spaced reinforcements 32, has an upwardly directly cylindrical portion 29 which has secured at its top steel band 30 anchored around pipe 10 forming a part of T fitting 21.

The lower closed end 31 of said cage is arranged adjacent, though above bottom wall 18, and is spaced from the interior adjacent wall of the regulator box at a point laterally displaced from outlet 15, as best illustrated in FIG. 1.

A buoyant ball 33 is loosely and guidably positioned within cage 28 and accordingly under normal operation remains at the lower end of said cage upwardly and laterally of the path of normal flow of fluids through regulator box 14.

While the ball is maintained by gravity at the lower end of said cage, it is nevertheless out of the way of discharging sewage. However, under flood conditions, rising water and sewage within chamber 20 of regulator box will lift ball 33 until it registers with valve seat 27 at outlet 10 as indicated in dotted lines in FIG. 2.

Ball 33 effectively seals off T fitting 21 from the flood waters, preventing their return to the interior of the building through house drain pipe 13. In other words, flood waters may rise within regulator box 14, but are positively constrained against return to the interior of the house or building 12.

The above described T fitting within regulator box 14 also includes the upright cleanout branch 23 which is aligned with outlet 10 and extends into top wall 16 of said box. Enlarged inlet 24 in top wall 16 has a removable lid 25. The regulator box is normally positioned below the basement floor 9 with its top wall 16 substantially flush with basement floor 9, FIG. 2. Alternately, the regulator box may be provisioned within the ground well below the finished grade outside the house and interposed in the drain line 13 between the building and the public sewer, as shown in FIG. 3.

While it may be installed anywhere on the outside of the building in line 13, it is recommended that the same be positioned as close as possible to public sewer 17' to take advantage of the steep slope of the drain pipe before it enters said sewer.

In the event the regulator is placed outside the building, FIG. 3, an extension cleanout pipe 23' is provided which projects through the ground down into opening 24 of the top 16 for communication with branch 23.

Removable lid 25' is nested within the bell end of cleanout pipe 23' and is removable for access therein. After a flood, it is recommended that the lids 25 or 25' be removed and box 14 hosed down with clean water. The present ball 33 may be made of rubber, cork, hollow cored metal or any other material which when made into a hollow ball will float.

The present invention includes a safety factor in the nature of a blow-off vent pipe 35 whose lower end joins effluent pipe 16'. Said vent pipe is on the outside of the building and terminates in an enlarged bell end 36 adjacent the finish grade 11 which has nested loosely therein the lid 37 normally closing said safety blow-off vent pipe.

The purpose of the safety blow-off vent pipe is to relieve pressure from the effluent line 16' and connected regulator box, when rising waters under flood conditions tend to fill chamber 20. The blow-off pipe 35 provides a means of escape of fluids by pushing off or displacing under pressure the loose lid 37.

This may permit the overflow of some fluids over the ground surface under flood conditions. However, this is much better and a more sanitary condition than the backing up of such fluids upon the interior of a house or other building.

The present fluid regulator box is fully automatic of simple design, and may be placed anywhere in the drain line in the building extending to the public sewer.

Blow off vent pipe 35 also serves the purpose of permitting a cleanout of the effluent drain line 16' in the direction of the sewer. The connection of pipe 35 to line 16' is curved away from the regulator box 14 so that a cleanout device inserted into and through pipe 35 will extend only in the direction of the sewer and will not enter the regulator box.

Having described our invention, reference should now be had to the following claims:

We claim:
1. The combination comprising a building, an underground sewer line spaced below the finished grade, an underground drain line inclined downwardly from said building to and connected with said sewer line, a reinforced concrete box in said drain line below the finished grade having top, bottom and side walls, there being an outlet opening in a side wall adjacent and on one side of said bottom wall receiving the portion of said drain line which connects with said sewer line, a hollow T-fitting within the upper end of the box over the opposite side of said bottom wall, said fitting including a horizontally disposed intake pipe projected outwardly through a side wall opposite from said outlet opening connected with another portion of said drain line connected with said building, said fitting including a downwardly directed outlet pipe, a yielding ball valve seat on its end, a wire cage joined at its upper end to and around said outlet pipe and depending angularly downward and spaced from said latter side side wall on the side of said box opposite said outlet opening and above said bottom wall, a buoyant ball loosely and guidably positioned in said cage at its lower end whereby the ball is displaced from the path of normal sewage flow through said box and adapted on backing up of sewage in said box to sealingly engage said valve seat, said T-fitting including an upright cleanout branch extending into said top wall, an upright extension pipe at its lower end joined to said cleanout branch, and extending up to and opening at said finish grade, a removable lid at the upper end of said extension pipe, said bottom wall being sloped and pitched downwardly towards said outlet opening whereby all fluids normally drain therethrough, an upright blowoff vent pipe on the exterior of said box joined at its lower end to said drain line adjacent said outlet opening and extending to said finish grade, and a removable lid nested within the upper end of said blowoff vent pipe.

2. The combination of claim 1, the connection of said blowoff vent pipe with said drain line being curved away from said box.

References Cited in the file of this patent
UNITED STATES PATENTS

| | | |
|---|---|---|
| 186,533 | Boldemann | Jan. 23, 1877 |
| 201,758 | Downey | Mar. 26, 1878 |
| 2,049,340 | Van der Horst | July 28, 1936 |
| 2,616,512 | Coon | Nov. 4, 1952 |

UNITED STATES PATENT OFFICE
CERTIFICATE OF CORRECTION

Patent No. 2,990,845                                                            July 4, 1961

David W. Sklash et al.

It is hereby certified that error appears in the above numbered patent requiring correction and that the said Letters Patent should read as corrected below.

In the grant, lines 1 to 3, for "David W. Sklash and Harley M. Selling, both of Detroit, Michigan," read -- David W. Sklash and Harley M. Selling, both of Detroit, Michigan, assignors of 33 1/3% to Martin A. Eisenstadt, of Detroit, Michigan, --; line 12, for "David W. Sklash and Harley M. Selling, their heirs" read -- David W. Sklash, Harley M. Selling, and Martin A. Eisenstadt, their heirs --; in the heading to the printed specification, lines 3 and 4, for "David W. Sklash and Harley M. Sellings, both of Detroit, Mich." read David W. Sklash and Harley M. Selling, both of Detroit, Mich., assignors of 33 1/3% to Martin A. Eisenstadt, 1522 Guardian Building, Detroit, Mich. --.

Signed and sealed this 12th day of December 1961.

(SEAL)
Attest:

ERNEST W. SWIDER                                              DAVID L. LADD
Attesting Officer                                      Commissioner of Patents